Patented Mar. 21, 1939

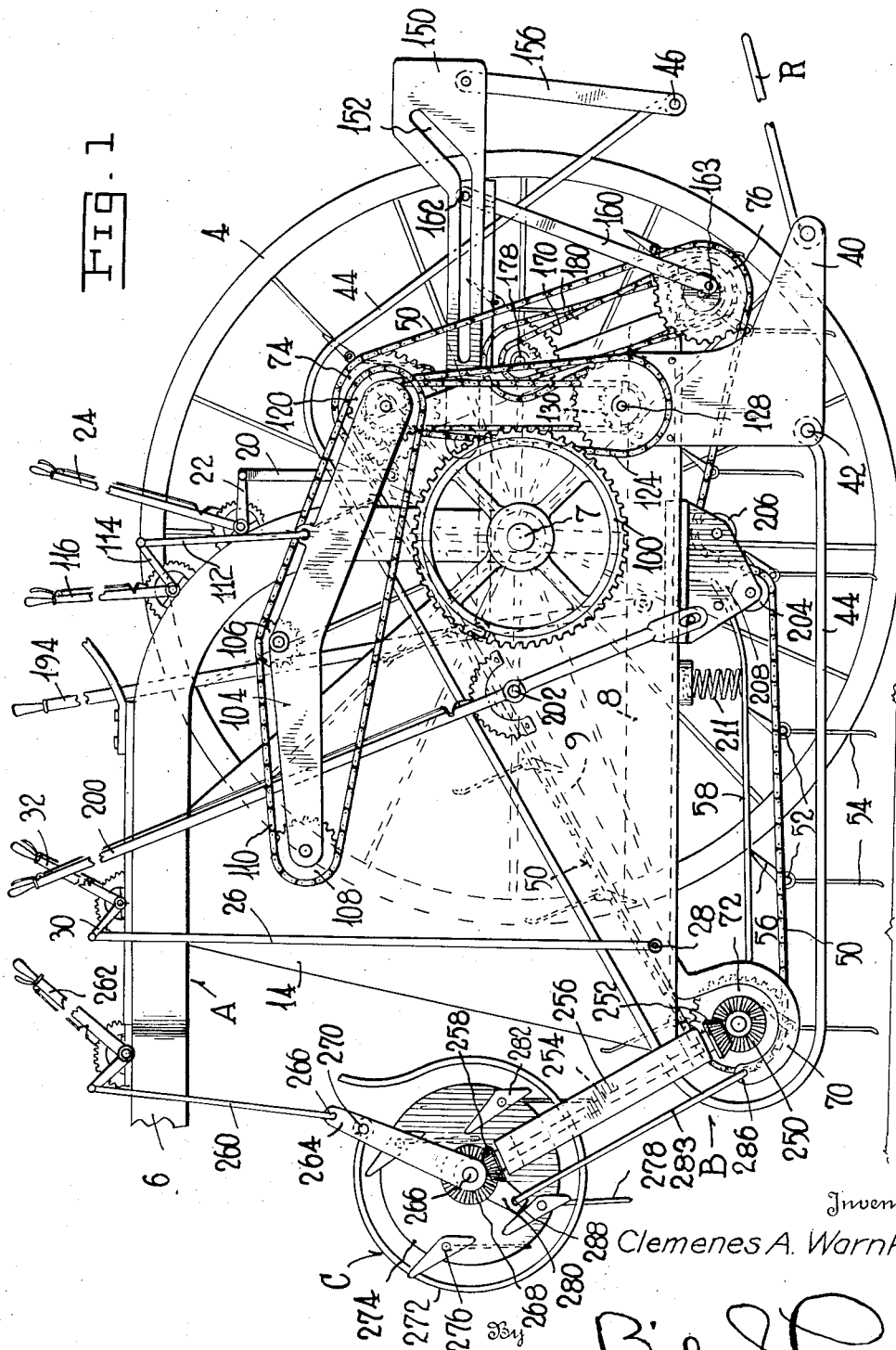

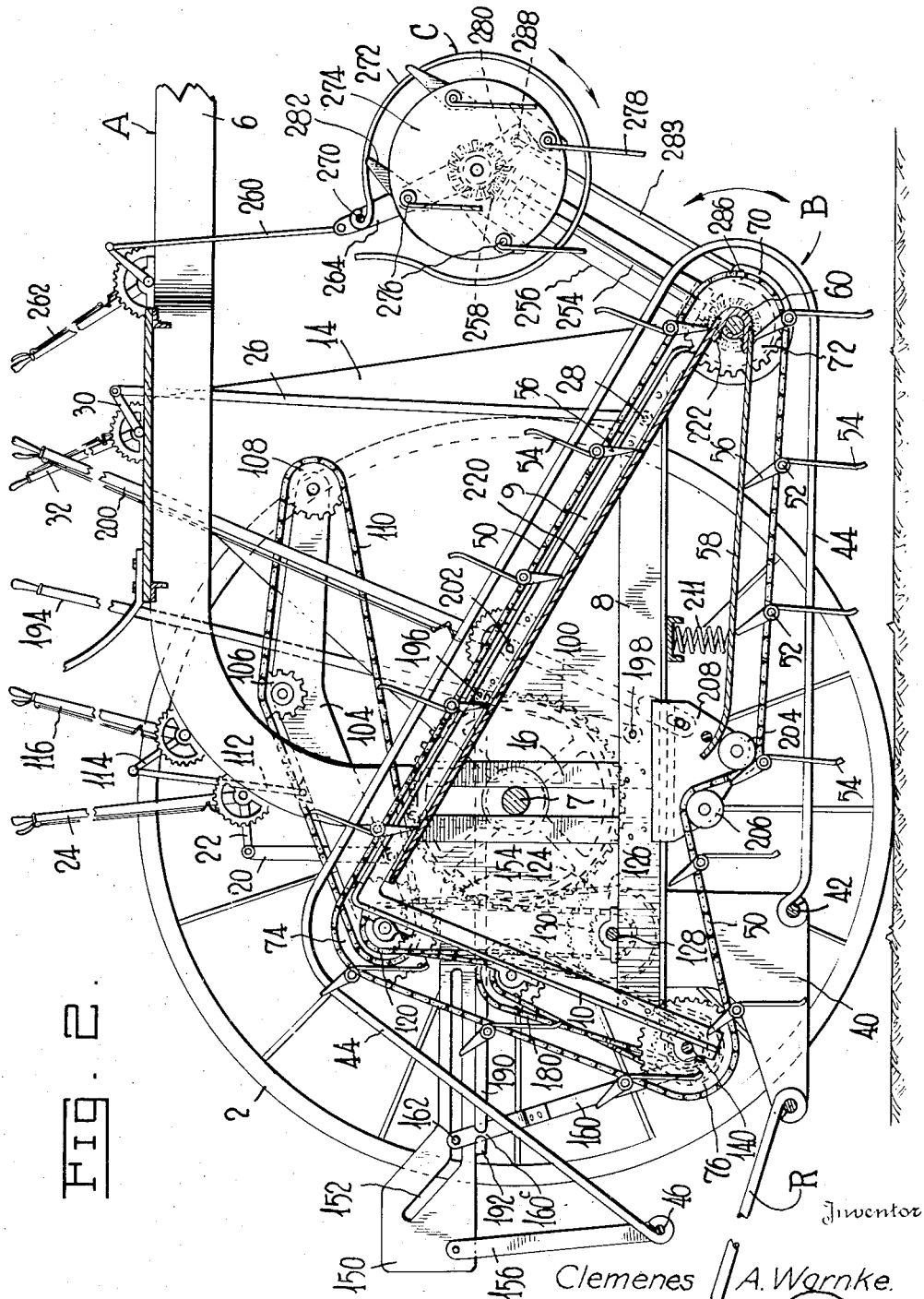

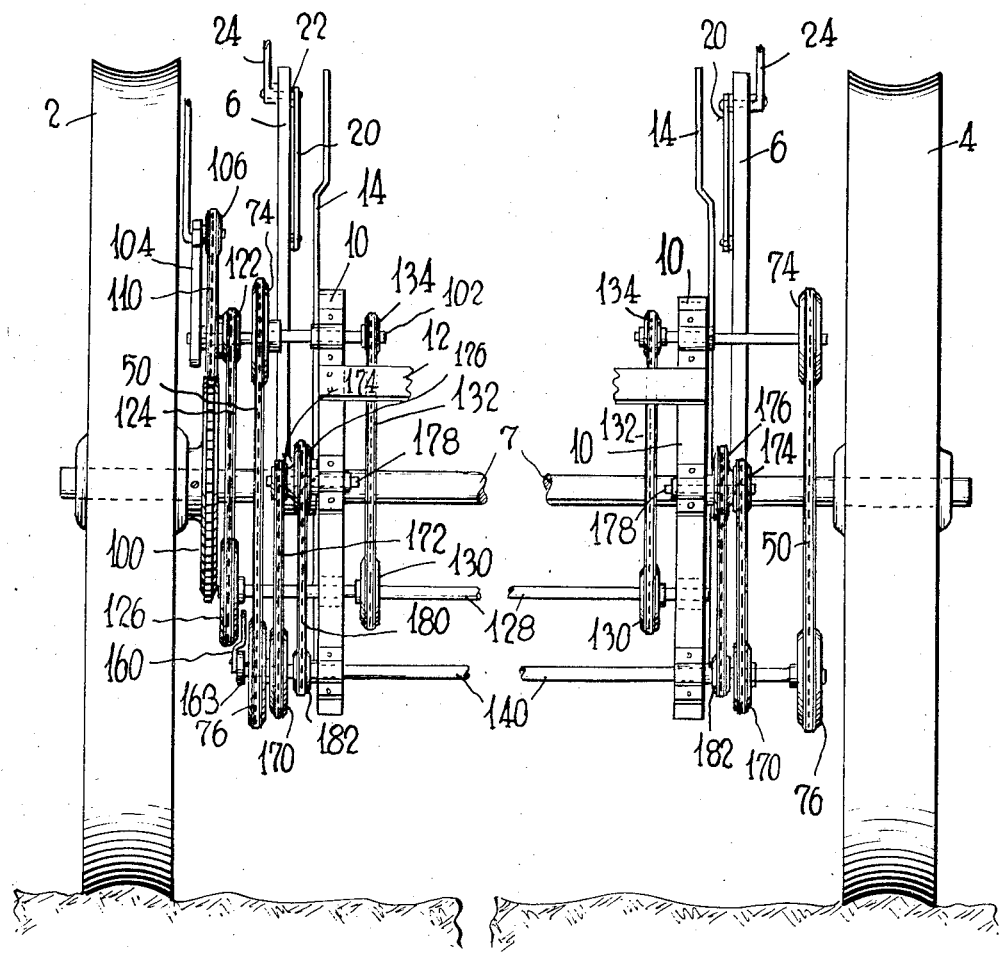

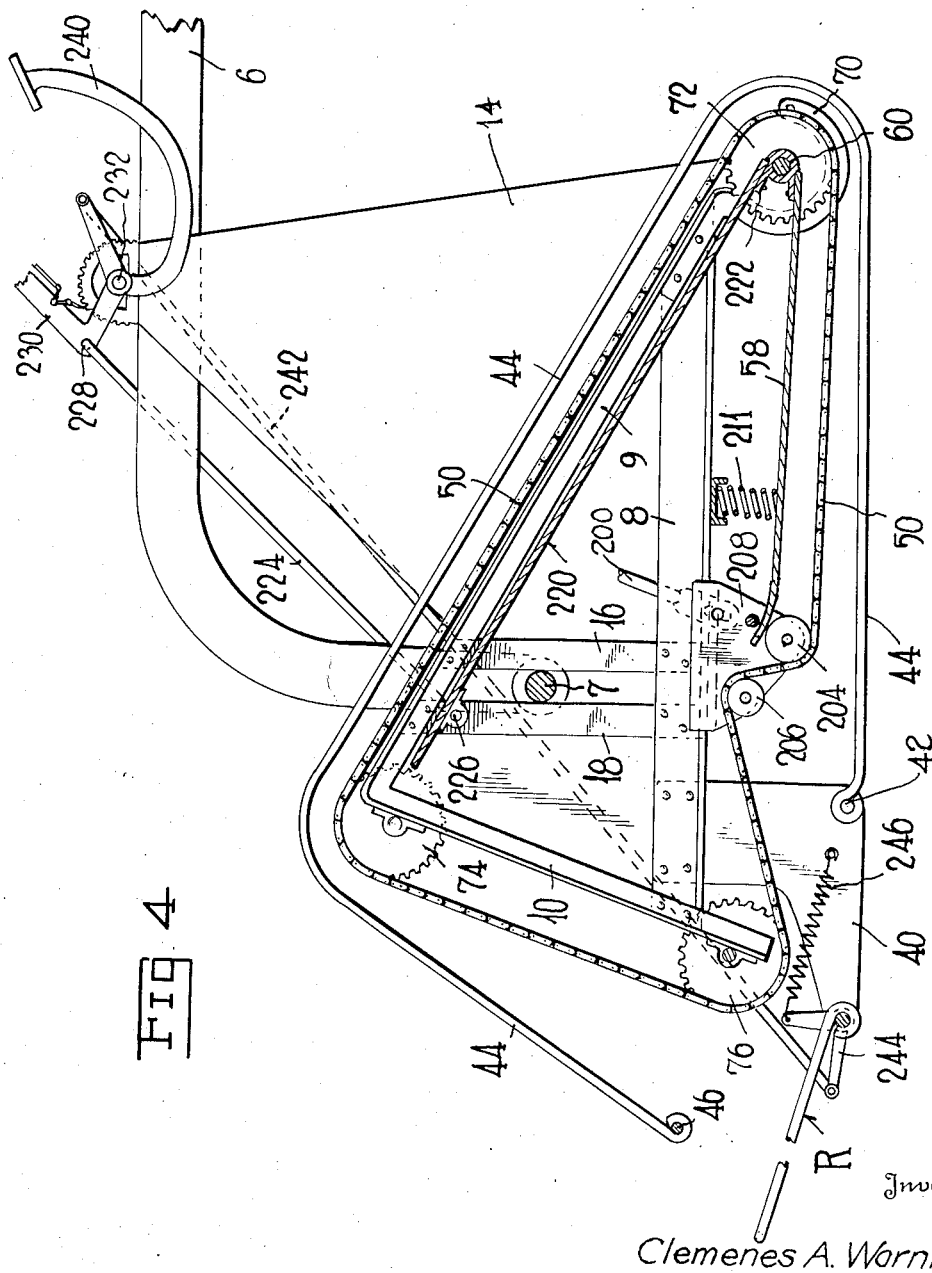

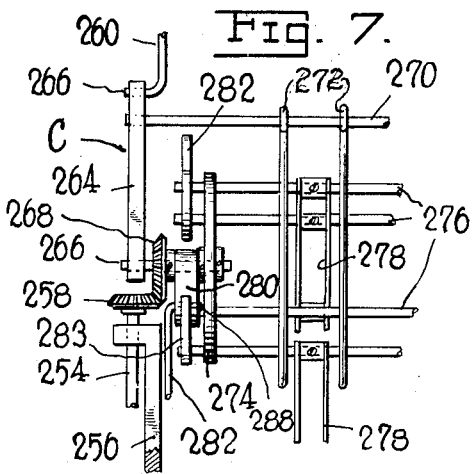
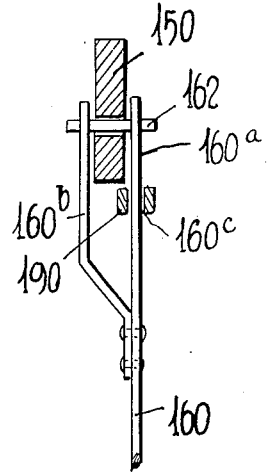
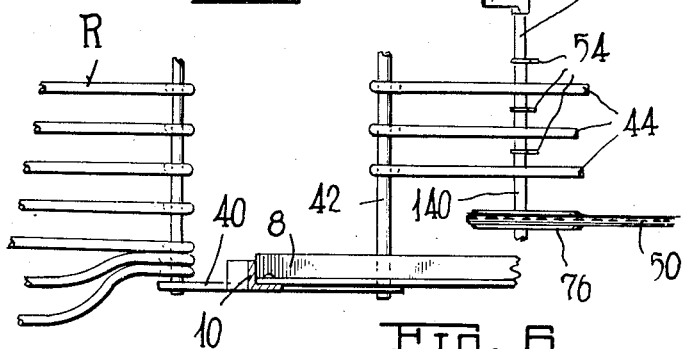
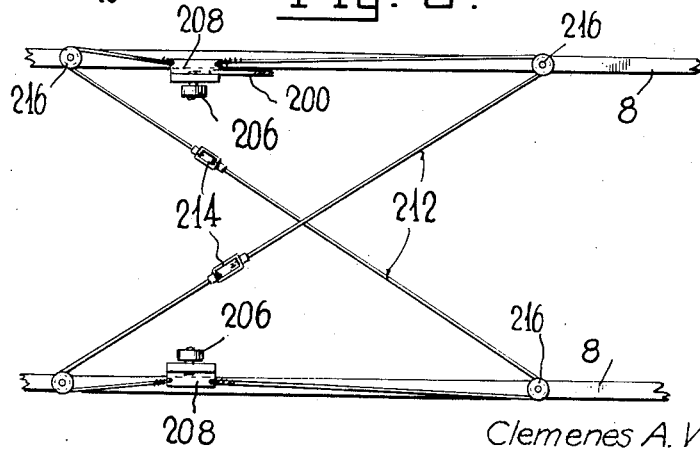

2,151,289

UNITED STATES PATENT OFFICE 2,151,289

BEAN HARVESTER

Clemenes A. Warnke, Grand Rapids, Mich.

Application February 28, 1938, Serial No. 193,175

18 Claims. (Cl. 56—346)

This invention is directed to new and useful improvements in a harvesting machine, and more particularly to a bean harvester.

In the harvesting of beans the vines are generally first cut and left lying upon the ground in order to dry. After having been dried by the sun to some extent, it is customary to rake the vines together so that they can be conveniently gathered and taken to a threshing machine. A primary object of this invention is to provide a machine which will not only collect the vines in a novel and unexpectedly efficient manner, but also will remove surplus dirt and dust which the vines have collected from lying on the ground.

Another object of my invention is to provide a machine which may be readily adjusted to varying positions to allow an efficient handling of the vines, and more particularly to adjust the position of the machine either transversely or longitudinally or both to compensate for the irregularities of the ground.

Still another object of my invention is to provide a machine which, as vines are being lifted from the ground, agitates the vines to sift the dirt therefrom and to deposit the clean vines upon the ground either in rows, or in spread-out condition for further drying, as may be desired.

A still further object of my invention is to provide a means whereby the vines may be collected in bunches after being cleaned.

Yet another object of my invention is to provide a novel means for picking the vines from the ground, and also it is an object of my invention to make a novel mechanism to obtain all the aforementioned objects.

Generally these objects of my invention are obtained by constructing a machine which comprises a triangular framework which supports a series of rack bars or slats which may be vibrated. Between these rack bars rake teeth move, which teeth also move adjacent the ground to pick up the vines and to move them over the agitated part of the rack bars. Suitable means is supplied to move the rake teeth, and also adjustable guide bars are supplied which allow the rake teeth to be adjusted to various positions, especially the position of the teeth with respect to the ground, and to a position which will allow a bunching of the vines upon the rack bars. Levers control the position of the triangular frame with respect to the axle so that the frame may be tilted from side to side or forwardly and backwardly, depending upon the contours of the ground.

A specific means by which the objects of my invention may be obtained is set forth in the following description of a machine taken in connection with the accompanying drawings.

In the drawings:

Fig. 1 is a side view of my machine with one of the driving wheels removed so as to show the mechanism for driving various parts of my machine.

Fig. 2 is a longitudinal sectional view of my machine, said view being taken through the center of the machine.

Fig. 3 is a rear view of the driving mechanism for my machine.

Fig. 4 is a schematic showing of part of my machine particularly showing the means for the bunching of the vines on the top of the conveyor rack, and the means for operating the tail rack.

Fig. 5 shows a plan view of the tail rack mechanism.

Fig. 6 is a plan view of the mechanism for making simultaneous adjustments on both sides of the machine through control means located on but one side of the machine.

Fig. 7 shows a partial front elevational view of the auxiliary pick-up mechanism mounted upon the front of my machine.

Fig. 8 is a cross-sectional view of the details of the shaker adjustment mechanism.

Generally speaking, the machine comprises a supporting frame A supporting my novel mechanism B. Frame A comprises wheels 2 and 4 having an axle 7 extending therebetween. Journaled upon this axle is a yoke member 6 to which may be secured any convenient means for pulling the machine, such as a tractor, or horses.

The mechanism B is adjustably hung from the yoke 6. This mechanism has two triangular frames, one on each side of the machine and located on the inside of the two legs of the yoke 6, respectively, each frame consisting of horizontally inverted T-bars 8, and obliquely extending bars 9 and 10 which form the front and back sides of the triangle respectively. These frames are connected by means of braces such as shown at 12 in Fig. 3. Rising from the frame bars 9, on each side of the machine are triangular sheet metal plates 14, fastened along their lower edges to said bars 9. Vertically extending between bars 8 and 9 are angle iron uprights 16 and 18, Fig. 2, one pair on each side of the machine, which angle irons are spaced apart to form slots through which the axle 7 extends. Thus a guideway is formed for adjustably mounting the mechanism B upon the supporting frame A.

On each side of the frame B rods 20 are connected near the apex of the triangular sections to the bars 9, said rods at their upper ends being joined to bell-cranks 22, on each side of the machine respectively, which are extended into handles 24. Bell-cranks 22 are pivotally secured to yoke 6 so that the frame B is hung from the yokes 6 through the rods 20. It is thus seen that by movement of the levers 24 the triangular framework can be raised and lowered because it slides in the guideways formed by angles 16 and 18 over the axle 7. Likewise, because one of these levers 24 is placed on each side of the machine, one side may be raised higher or lower than the other side, thus allowing the mechanism B to be adjusted according to the contour of the ground independently of the position of the wheels 2.

The mechanism B may also be adjusted to tilt forwardly or backwardly by means of a rod 26 pivotally attached at 28 to the forward portion of the triangular frame. This rod is likewise secured to a bell-crank 30 attached to a lever 32, said bell-crank being pivotally secured to the yoke 6. It is apparent that movement of the lever 32 will cause the mechanism B to be tilted either forwardly or backwardly with the axle 7 functioning as the pivot point of the tilt.

The triangular frame composed of the bars 8, 9 and 10 carries a conveyor system with novel adjusting means therefor to enable beans to be picked up from the ground, carried over the top of the harvester and deposited upon the tail rack R in the rear. As shown in Figs. 1 and 2, plate members 40 depend from the rearward end of each side of the machine. These plate members are connected by means of a transversely extending rod 42. Spaced across this transversely extending rod are secured a plurality of slat-like members 44. (Note Fig. 5.) These bars extend continuously toward the front of the machine up around and over the top of the triangular bars 9 and 10, generally following the contour thereof, and terminate at the rear of the machine and above the tail rack, by being secured to a transversely extending bar 46. It is noted at this point that movement of the bar 46 will cause a movement of the spaced bars 44 in a manner and having a purpose later described.

Mounted between the bars 44 and the triangular frame members 8, 9, and 10 is a conveyor system which comprises a pair of conveyor chains 50, one on each side of the machine, to which are connected parallel spaced rods 52 which extend transversely of the machine and upon each of which rods are fastened a plurality of teeth 54. In the middle of the bars 52 are secured cam members 56 which are adapted to bear upon a plate member 58 serving as a cam board and secured at its forward end to a bracket 60 connected to the forward end of the mechanism B.

The forward frame member rod 9 is continued forwardly until it joins the horizontally disposed T-member 8. A U-shaped section 70 is bolted to frame member 9 on each side of the frame B. Journaled to this U-shaped member 70 through means of a casting and a shaft are wheels 72 around which chains 50 pass. Chain 50 is extended up to the apex of the triangular frame members where it passes over wheels 74 and then extends downwardly to the lower rear part of the machine where it extends around wheels 76. The chain 50 is thus seen to be continuous and generally follows the outline of the triangular frame. It is furthermore seen that the teeth 54 project through the bars 44, and upon movement of the chain these teeth will be carried around the triangular frame.

The mechanism for driving this chain is as follows: Fixedly secured to the wheel 2 on one side of the machine is a cog wheel 100 which turns as the wheel 2. At the apex of the triangular frame is journaled a short shaft 102, one shaft being on each side of the machine as shown in Fig. 3. On the shaft adjacent the wheel 2 a bell-crank 104 is pivotally secured at one end. The shaft rotates freely with respect to the bell-crank. This bell-crank supports at its middle portion a wheel 106 and at its forward portion a wheel 108, around which wheels extends a chain 110. It is noted at this point that the shaft 102 is located rearwardly of the wheel 100 and that when the bell-crank rotating upon the axis 102 is lowered, by means of lever 112 controlled by bell-crank 114 pivotally secured to the yoke 6 and operated by the handle 116, the chain 110 will be lowered into engagement with the wheel 100, thus causing a rotation of the chain 110.

At the rear end of the bell-crank 104, the chain 110 passes over wheel 120. Fixedly secured to this wheel 120 and freely rotating upon shaft 102 is a wheel 122 (note Fig. 3), which wheel has mounted thereupon and drives a chain 124. Chain 124 extends downwardly to a wheel 126 which is fixedly secured to a shaft 128 extending all the way across the machine, said shaft being journaled upon the horizontally extending bars 8 on each side of the mechanism B. Fixedly secured to the shaft 128 and located inwardly of the sides of the triangular frame are wheels 130 which rotate as the shaft 128. These wheels 130 drive chains 132 which extend upwardly to wheels 134 fixedly mounted upon the shaft 102. Shafts 102 therefore turn as chains 132 and drive wheels 74 secured thereto. As before noted, wheels 74 carry the chains 50 and therefore movement to the chain 50 is given by the aforedescribed mechanism.

As previously stated, chains 50 continue around wheels 76 at the lower rear end of the machine. Wheels 76 are fixedly secured to a shaft 140 extending transversely of the machine and journaled upon the lower end of frame bar 10 (note Figs. 2 and 3). Movement of chain 50 driven from wheel 74 on the left hand side of the machine as shown in Fig. 3, thus gives movement to the chain 50 on the right hand side of 53.

As previously described, the bars 44 terminate at one end by being secured to a transverse rod 46. A novel shaking mechanism for shaking these bars is constructed as follows: On one side, or, if desired, on each side of the frame members, is secured a rearwardly extending plate 150 which has a slot 152 extending obliquely and horizontally therein. This plate is pivotally attached to the frame at one end at 154. To the outer end of the plate is pivotally secured a depending rod 156, which rod, at its lower end, is secured to the transversely extending rod 46. A rod 160 has one end slidably secured at 162 within the slot 152. The other end of this rod 160 is eccentrically secured to a wheel 163, which wheel is mounted upon shaft 140.

Referring back now to wheel 76, which is rotated by movement of the chain thereover, and which is freely rotatable upon shaft 140, it is seen from Fig. 3 that wheel 170 is fixedly secured to wheel 76 so as to be rotated thereby, this wheel being also freely rotatable upon shaft 140. Wheel 170 rotates and drives the chain 172, which chain drives companion wheels 174 and 176 which are secured to each other and are mounted to rotate upon shaft 178 which is journaled upon framework bar 10. Wheel 176 drives a further chain 180 turning wheel 182 which is fixedly mounted upon shaft 140, which shaft rotates as wheel 182. Shaft 140 rotating will rotate wheel 163 which is secured thereto, which wheel drives the eccentric pivot to which rod 160 is secured. Therefore the reciprocating motion given rod 160 is transmitted to plate 150 and thence through rod 156 to the rods 44. Thus these rods are vibrated preferably 4 to 6 times the forward speed of the machine, and are vibrated as the teeth 54 are being passed therebetween. This vibration shakes the dirt and dust from the beans and the vines as they are being transported over the rods 44. Adjustment as to the degree of vibration which may be obtained is readily made by means of slot 152 to which rod 160 is secured at 162. As shown, a rod 190 is secured to rod 160 at 192, rod 160 being bifurcated to form legs 160a and 160b which extend on opposite sides of plate 150, leg 160 being slidably mounted in rod 190 at 160c as seen in Fig. 8. The other end of this rod 190 is secured to a lever 194 (note Fig. 2) at 196. Lever 194 has its lower end pivotally secured to frame bar 8 at 198. Therefore rearward movement of lever 194 will move control rod 190 to the left and move pivot 162 from the horizontally extending portion of slot 152 to the obliquely extending portion. At such position the reciprocal motion of rod 160 will be taken up in the slot 152 without vibrating the plate 150. Consequently lever 194 functions as a clutch member which enables the vibration of the rods to be stopped at any desired time.

It has been previously described how the entire mechanism B may be either tilted sideways, or forward, or backward in order to make the mechanism conform to the surface of the ground. A further means exists to adjust the teeth so that they may be positioned with a greater degree of fineness toward the ground, and a still further means exists to enable the teeth to collapse on the rising portion of the triangular frame so that the vines may be collected in bunches and, as bunches, be deposited onto the tail rack or onto the ground.

As shown in Figs. 1 and 2, a cam board 58, as previously described, extends in the central portion of the machine and upon which cam surfaces 56 of the teeth supporting bars engage. One end of this cam board is attached to the forward end of the mechanism B at 60 and the other end is adjustably manipulated by a lever 200. Figs. 1 and 2 show this lever 200 pivotally connected to the frame bar 9 at 202, and extended downwardly beneath the horizontal frame bar 8 where it terminates in a roller 204. Chain 50 extends up and over a roller 206 and then beneath roller 204. Roller 206 is journaled upon a bracket 208 slidably mounted on the horizontally extending flanges of the inverted T-bar 8. A bar 210 connects the lever 200 and this slidable element. Therefore, as lever 200 is moved the wheel 204 will be moved parallel to bar 8, and if moved to the left in the view of Fig. 1 will change the position of the chain with respect to the ground. As slidable element 208 moves, because of bar 210, with the movement of the lever 200, the change in the length of the chain is automatically compensated for. The position of board 58 is maintained by compression spring 211, said spring being of proper strength to hold the teeth in vertical position by pressure on lugs 56.

Therefore, by this construction the teeth 54 may be adjusted so that they may contact the ground or may be spaced from the ground in varying degrees. It is to be understood that this adjustment of the teeth 54 is an additional adjustment over the adjustment of the entire mechanism B.

In order that the lever 200 may be used to adjust the chain 50 equally and simultaneously on each side of the machine with the use of a single lever 200, a structure such as shown in Fig. 6 is advantageously used. A slidable element similar to the element 208 shown in Fig. 1 is mounted on the base bar 8 on the other side of the machine. This element also carries a wheel 206 over which the chain 50 is adapted to pass. A continuous belt 212, which may conveniently have toggles 214 therein for purposes of adjustment, extends in the form of a numeral 8 from the slidable element 208 on one side of the frame to the slidable element 208 on the other side of the frame, said belt passing over pulleys 216 mounted on the frame bars 8. Therefore movement of the bar 200 connected to one of the movable elements will move the other element in the same direction.

It has been described how vines lying on the ground may be picked up by the teeth 54 and carried upwardly over the rising portions of the rods 44 where they are shaken by means of the vibration of the rods 44 in order to remove dust and dirt from the vines. It is apparent from the operation so far described that the vines will be dropped upon the tail rack at the same rate as they are being carried over the top of the rods 44. If the tail rack is in its lowered position, the vines will then be evenly distributed over the ground. Assuming now that the tail rack remains in its lowered position, a novel means is given in the machine for allowing the vines to be collected in bunches on the rising section of the rods 44; that is, the vines are collected into bunches while they are being shaken. The novel mechanism for effecting this operation is shown in Figs. 1 and 2, this mechanism being shown in greater detail in Fig. 4. A cam board 220 extends beneath frame bars 9 and is secured at the forward end of the machine at 222. This cam board is mounted in the center of the machine in a manner similar to the mounting of the cam board 58 previously described, and although one end thereof is fixed at 222, the upper part of the board may be displaced downwardly by means of a rod 224 secured to the board 220 at 226. Lever 224 is pivotally mounted at 228 to a bell-crank 230, said bell-crank being pivotally journaled to the metal plate 14 at 232. Movement of the bell-crank 230 (note Fig. 4) to the left will cause the cam board 220 to be deflected downwardly. Such a downward movement will move the cam board away from the cams 56 controlling the teeth 54 and therefore under the weight of the vines the teeth will rotate to the right and fall beneath the surfaces of the rods 44. Vines therefore will not be moved by the teeth at this point and will be collected with vines being carried up the inclined rods 44 by teeth which have not been affected by the downward movement of the cam board so as to cause the teeth to fall beneath the surface of the rods 44. When the bunch of vines thus collected have been shaken clean the bell-crank 230 may be rotated so as to move the cam board 220 upwardly. The cams 56 will then again strike the boards forcing the teeth to rise above the surface of the slats and the vines will be moved over the apex of the machine and dropped upon the rack and as a bunch upon the ground.

While bunches may be formed in the manner described, it may be desirable to hold this bunched material on the tail rack to enable it to be dropped at a pre-determined position. Thus, if the machine is moving longitudinally of the field upon which are uniformly strewn cut vines, it may be the function of the machine to pick up the vines and after having shaken them to remove the dust and dirt therefrom, to deposit them in rows running transversely of the field. Therefore, immediately adjacent the bell-crank 230 which controls the action of the cam board 220, a foot pedal 240 is mounted which is connected through a rod 242 to the tail rack R. This connection is through another bell-crank lever 244. Reference to Fig. 4 shows that the tail rack R is normally held in its upper position by means of a spring 246. By pressing on the foot pedal 240 the rod 242 is caused to move downwardly, thus dropping the tail rack to the ground. If bunches are deposited upon the tail rack, these bunches can be dropped at any desired instant, for example, to form rows extending transversely of the field, by movement of the foot pedal 240.

In order to facilitate the picking up of the vines, and placing them upon the rising portion of the rods 44, an auxiliary pick-up device may be advantageously mounted on the front of the machine. This mechanism is denoted generally at C (note Figs. 1, 2 and 7). Wheel 72 mounted on the forward end of the machine, and over which chain 50 is adapted to travel and to drive, has connected thereto a bevelled gear wheel 250. A second bevelled pinion gear 252 engages gear 250 and drives the shaft 254 journaled in a supporting member 256. The other end of shaft 254 drives a bevelled gear 258, which gear gives movement to the auxiliary pick-up mechanism. This mechanism in general is hung from the frame 6 through rod 260 which depends from a lever 262 pivotally secured to the yoke 6. Rod 260 is pivotally connected to a bar 264 at 266, this bar 264 forming a part of the supporting framework for the mechanism C. At the lower end of the rod 264 is journaled a shaft 266, which shaft carries a bevelled gear 268 meshing with gear 258. Further connected to rod 264, it being understood that one of these rods is mounted on each side of the machine and that only one half of the unit is here described, the other half being similar thereto, is a transversely extending bar 270, to which are secured a plurality of spaced curved rods 272 which are similar in their function to the rods 44 described for the mechanism B. On the inner end of the shaft 266 is mounted a disc 274 through which, adjacent the periphery thereof, rake teeth supports 276 extend. Rake teeth 278 are mounted upon supports 276 and are adapted to extend through the slots 272 in the manner described for the teeth 54 with respect to the slots 44 in mechanism B. Disc 274 is rotated by movement of the shaft 266 driven by gear 268. Loosely mounted on shaft 266 is a cam 280, and each rack support bar 276 has a cam engaging member 282 secured thereto. The position of this cam 280 is controlled by means of a bar 283, one end of which is attached to the bar 76 at 286, and the other end being attached to the cam 280 at 288.

The function of the pick-up mechanism is as follows: In its position shown, the teeth are being rotated through the rods 272, but the mechanism is raised out of operating position. Movement of the lever 262 will cause the rod 260 to drop, lowering the entire mechanism C to a point in front of the mechanism B, where the teeth 278 will engage vines lying upon the ground and will lift said vines so that they may be engaged by the teeth 54 on the mechanism B. As the mechanism C is lowered, rod 282 causes the cam 280 to be rotated about the shaft 266 to such a position as will force the teeth to assume a projecting position so that they will be held in a position where they extend outwardly of the slots and engage the vines. It is of course understood that the teeth 278 are mounted in a position where they will not strike the teeth 54. As the teeth 278 pick up the vines, said vines are engaged by the teeth 54 and carried upwardly of the machine. The cams mounted on teeth 278, however, are quickly released from the cam surface of cam 280 so that the teeth 278 release their hold upon the vines and are released so that they may enter within the rods 272. The curvature of the rods 272 insures the keeping of the vines out of the mechanism C.

Having now described an apparatus by which I obtain the objects sought by my invention, what I claim is:

1. A bean harvester having a plurality of spaced rods comprising means for picking bean vines off the ground and conveying them over said rods, and means for shaking said rods while said vines are being conveyed thereover.

2. A bean harvester machine comprising a plurality each in spaced rods of substantially the form of a triangle, a plurality of rake teeth projecting between said rods, means to move said teeth along said rods, and means to adjust the position of said teeth during their movement between said rods.

3. A bean harvester machine comprising a plurality of spaced rods, each of said rods having a horizontally extending portion fixed at one end, an upwardly extending portion and a downwardly extending portion, and means attached to the downwardly extending portions adapted to vibrate said rods.

4. A bean harvester machine comprising a plurality of spaced rods, a plurality of teeth movable through the spaces between said rods, cam means for holding said teeth to project between said rods, means for adjusting said cam means dropping said teeth beneath said rods at pre-determined intervals of their passage through said rods, and means to vibrate said rods.

5. A bean harvester machine comprising a pair of wheels, an axle extending between said wheels, a supporting and pulling yoke mounted upon said axle, and a harvester mechanism adjustably supported upon said yoke, said mechanism comprising a plurality of spaced rods and a plurality of teeth supported by said mechanism and means for said teeth between said rods.

6. In a bean harvester machine adapted to be moved across the ground, a triangular frame, a conveyor system movable about said triangular frame, teeth on said conveyor system, and means for adjusting the spacing of said teeth in varying distances from the ground during the travel of said teeth adjacent said ground.

7. In a bean harvester, a plurality of spaced rods arranged substantially in the form of a triangle to form a support over which vines are conveyed, means fixing one end of said rods and means to vibrate the other end of said rods to shake said vines while conveyed thereover.

8. In a bean harvester as in claim 9, a frame, said means to vibrate said rods comprising a slotted plate pivotally fixed to said frame, means connecting said plate to said rods, and reciprocating means adjustably connected to said plate in said slot.

9. In a bean harvester machine, a triangular frame, a conveyor system composed of cam adjusted teeth mountd upon said frame, a cam board adjacent said teeth, and means to adjust said cam board to change the relative positions of said teeth with respect to said frame.

10. In a bean harvester machine, a harvesting mechanism, wheels having a pulling yoke journaled to an axle extending between said wheels for supporting said mechanism, guide bars secured to said mechanism for the vertical adjustment thereof with respect to said axle, and rods extending between said yoke and said mechanism for tilting said mechanism transversely of said machine.

11. A machine as in claim 10, a second rod extending between said yoke and said mechanism for tilting said mechanism longitudinally of said machine.

12. A bean harvester machine comprising a conveyor mechanism composed of rake teeth extending between spaced bars and means to move said teeth longitudinally of said bars, cam means for tilting said teeth, and adjustable cam boards for controlling said cam means.

13. A bean harvester comprising supporting wheels, a drive wheel connected to one of said wheels, an axle connecting said wheels, a conveyor mechanism adjustably mounted upon said axle, a bell-crank having one end pivotally secured to said conveyor mechanism, a drive chain movably mounted on said bell-crank, means for moving said bell-crank to bring said chain into operative engagement with said drive wheel, and means for operating said conveyor mechanism from said chain.

14. A bean harvester as in claim 13, said conveyor mechanism consisting of a triangular frame, a series of spaced bars having one end fixed to said frame, means driven from said chain for vibrating the other end of said bars, and teeth means for travel between said bars.

15. A bean harvester as in claim 13, said conveyor mechanism consisting of a triangular frame, a series of spaced bars having one end fixed to said frame, said bars being spaced from and extending substantially around said frame, a bar connecting the other ends of said bars, a plate having a slot therein and pivotally secured at one end to said frame, means connecting the other end of said plate to said bar, an arm adjustably mounted in said slot, means connected to said operating means for moving said arm to vibrate said plate and bars, and means for adjusting said arm in said slot.

16. In a bean harvester, having a series of rake teeth movable between spaced parallel rods and a tail rack, means for maintaining said tail rack in normally raised position, and means for simultaneously lowering said tail rack and lowering said teeth beneath said rods.

17. A bean harvester as in claim 13, a second chain supported by said conveyor mechanism and movable by said operating means, rake teeth secured to and movable with said second chain, and means for adjusting said second chain with respect to said mechanism to vary the position of said teeth with respect to the ground.

18. A bean harvester as in claim 13, an auxiliary pick-up device connected to said mechanism, rake teeth movably mounted in said device, means for moving said device up and down with respect to said mechanism, and means responsive to said moving means for setting the angle of said rake teeth.

CLEMENES A. WARNKE.